(12) United States Patent
Swope

(10) Patent No.: US 8,823,518 B2
(45) Date of Patent: Sep. 2, 2014

(54) METHOD OF SENSOR CLUSTER PROCESSING FOR A COMMUNICATION DEVICE

(75) Inventor: Charles B. Swope, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1083 days.

(21) Appl. No.: 12/330,288

(22) Filed: Dec. 8, 2008

(65) Prior Publication Data

US 2010/0141399 A1   Jun. 10, 2010

(51) Int. Cl.
| | |
|---|---|
| H03C 1/62 | (2006.01) |
| H04B 17/00 | (2006.01) |
| G08B 1/08 | (2006.01) |
| H04W 4/00 | (2009.01) |
| H04B 7/212 | (2006.01) |
| H04W 52/02 | (2009.01) |
| H04M 1/725 | (2006.01) |

(52) U.S. Cl.
CPC ........ *H04M 1/72569* (2013.01); *H04W 52/029* (2013.01); *Y02B 60/50* (2013.01); *H04M 2250/12* (2013.01); *H04M 2250/10* (2013.01)
USPC ............ 340/539.22; 340/539.26; 340/539.27; 340/539.28; 455/115.1; 370/338; 370/347

(58) Field of Classification Search
None
See application file for complete search history.

(56) References Cited

U.S. PATENT DOCUMENTS

| | | | |
|---|---|---|---|
| 5,903,217 A * | 5/1999 | Stanczak et al. ............... | 340/554 |
| 6,373,237 B1 | 4/2002 | Oldendorf et al. | |
| 7,054,747 B2 | 5/2006 | Ruelke et al. | |
| 7,113,810 B2 * | 9/2006 | Kim ............................... | 455/574 |
| 7,117,379 B2 | 10/2006 | Hamilton | |
| 7,424,740 B2 | 9/2008 | Bear et al. | |
| 7,522,639 B1 * | 4/2009 | Katz .............................. | 370/503 |
| 2004/0066313 A1 * | 4/2004 | Ong et al. ................. | 340/870.11 |
| 2004/0078219 A1 * | 4/2004 | Kaylor et al. ...................... | 705/2 |
| 2004/0135903 A1 * | 7/2004 | Brooks et al. ............ | 348/231.99 |
| 2004/0203838 A1 | 10/2004 | Joshi et al. | |
| 2004/0243281 A1 * | 12/2004 | Fujita et al. ................... | 700/245 |
| 2007/0239813 A1 | 10/2007 | Pinder et al. | |
| 2008/0108913 A1 * | 5/2008 | Lengsfeld et al. ............ | 600/595 |

(Continued)

FOREIGN PATENT DOCUMENTS

| | | |
|---|---|---|
| EP | 1988443 A2 | 11/2008 |
| WO | 2002030130 A1 | 4/2002 |

OTHER PUBLICATIONS

3-Axis Accelerometer With Digital Interface—H30CD—8 Pages. http://www.hitahcimetals.com/product/sensors/accelorometer/.

(Continued)

*Primary Examiner* — George Bugg
*Assistant Examiner* — Renee Dorsey
(74) *Attorney, Agent, or Firm* — Barbara R. Doutre

(57) ABSTRACT

A sensor enhanced communication device (200) is provided with a wake mode, a standby mode and sleep mode. The sleep mode is a periodic occurrence within the standby mode which places a cluster of sensors and transducers (202) into a state of arousal in which the sensitivity of the transducers and sensors is increased while the sampling rate is decreased. Incremental learning can occur during the sleep mode as well as basic memory transfers. Since the cluster does not have to re-acquire information upon entering wake mode, the overall power efficiency is improved.

25 Claims, 4 Drawing Sheets

(56) References Cited

U.S. PATENT DOCUMENTS

2008/0231442 A1* 9/2008 Schafer et al. ............... 340/540
2008/0309481 A1* 12/2008 Tanaka et al. ............ 340/539.12
2009/0059827 A1* 3/2009 Liu et al. ...................... 370/311
2010/0070786 A1* 3/2010 Qing et al. .................... 713/321

OTHER PUBLICATIONS

Low Power Wireless Sensor Networks—23 Pages. http://www-mtl.mit.edu/research/icsystems/uamps—23 Pages.

Jie Zhang—"Memory Process and the Function of Sleep"—Journal of Theoretics, vol. 6—Dec. 2004—7 pages.
International Search Report and Written Opinion for International Application No. PCT/US2009/057394 mailed on Apr. 27, 2010.
International Preliminary Report on Patentability for International Application No. PCT/US2009/057394 mailed on Jun. 23, 2011.
"IEEE 1451.4 Sensor Templates Overview," Retrieved from http://zone.ni.com/devzone/cda/tut/p/id/3468#toc0, published Oct. 30, 2012, pp. 1-18.
R. Charry et al: Sensor-Based Power Management For Mobile Devices Dated Jun. 26-29, 2006—7 Pages.

* cited by examiner

METHOD OF SENSOR CLUSTER PROCESSING FOR A COMMUNICATION DEVICE

FIELD OF THE INVENTION

The invention generally relates to communication devices and more particularly to sensor enhanced electronic communication devices.

BACKGROUND OF THE INVENTION

With sensors being integrated into communication products, new processing techniques are continually being developed in an attempt to mimic processes found in nature. Although it has been shown that nature's quantization levels are slightly higher than today's sensor technology, the new sensor technology is power efficient and small thereby allowing for increased integration into smaller devices. However, with the ability to more readily integrate sensors comes the challenge of trying to efficiently manage device resources and ultimately provide valuable information to both the user and the device itself. In particular, when dealing with battery operated portable communication devices, such as two-way radios, the ability to manage radio functionality and sensor resources is critical in that energy consumption is a major concern.

Accordingly, it would be desirable to provide an improved management process for controlling device resources of a sensor enhanced portable communication device.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
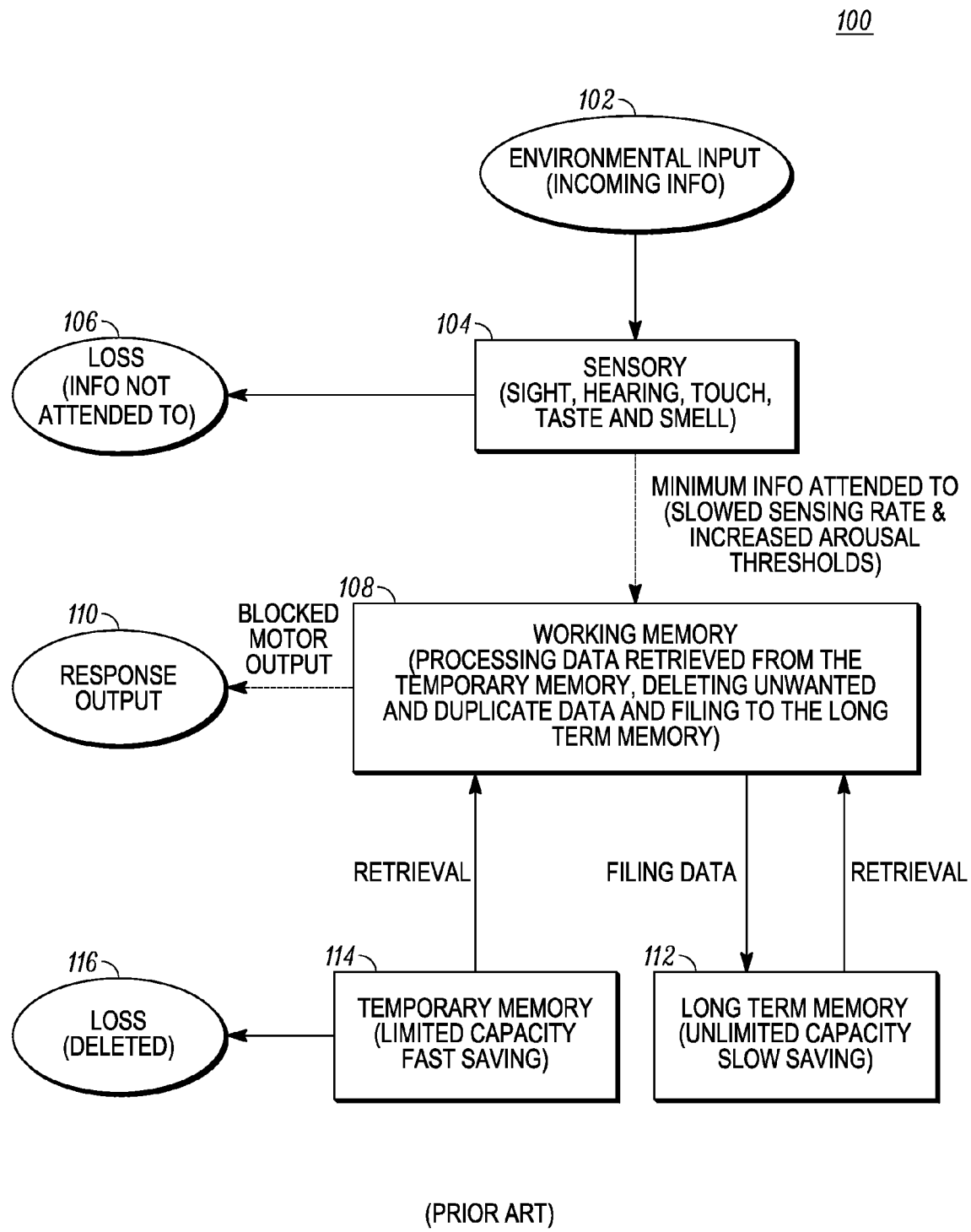
FIG. 1 is a known memory model for a human being.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in method and apparatus components related to sensor enhanced devices (SED), particularly portable radio communication devices having sensors integrated therein, and the efficient management of those sensors in conjunction with radio resources. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

For the purposes of this application a SED device will be considered to be a battery powered portable two-way radio communication device having sensors and/or transducers intergraded therein. In the two-way radio environment, the radio is considered to be in standby mode when as much functionality as possible is shut down in an attempt to save energy, thereby allowing the radio to last a full charge cycle (for example 10 hours or more). In standby mode, the radio frequency (RF) integrated circuits and controls are managed so as to reduce clocks and instructions as well as to shut off unnecessary analog functions when no audio or data is being received. The goal of standby mode is to quickly determine if there is a real signal being received that needs to be processed and to turn on the rest of the radio functions in a timely manner to process that signal. In today's sensor enhanced communication devices, the sensors expend more energy than necessary and even expend energy in order to re-capture information the sensor has already gained when coming out of standby mode and entering into a fully operational wake mode. Accordingly, as sensors are added to electronic devices that influence the well-being of the device (for example a temperature sensor that senses overheating) and the user of the device (for example a sensor providing location/GPS data to the user) the management of sensor controls and functionality within the radio's operating modes needs to be addressed.

A brief look at Zhang's memory model, shown in FIG. 1, is used to better describe the sensory problem. While Zhang's memory model 100 describes what humans do during sleep, the model is provided to illustrate sensory functionality and interoperability. The end goal of this application is to produce an electronic sensory enhanced communication device that can closely emulate the sensory functionality of Zhang's model. To achieve this goal several challenges are presented. Referring to FIG. 1, incoming sensory information is provided as an environmental input 102 into a sensory function 104, i.e. the human brain, which controls sight, hearing, touch, taste and smell. The sensory function 104 is where humans expend the most energy. Following the sensory stage 104, the information may be lost 106 if the information is not attended to. Alternatively, a minimum amount of information may be attended to via working memory at 108. Working memory 108 may process data that results in an immediate response as a motor output 110 or blocking of the motor output. Working memory 108 provides numerous other functions including deleting unwanted and duplicate data and filing information to and retrieving information from long term memory 112. Working memory 108 may also process data temporarily stored in temporary memory 114. Long term memory 112 is considered to have unlimited capacity and has a slower saving rate than temporary memory 114 which has limited capacity. Eventually data stored in temporary memory 114 is either lost or deleted 116. In accordance with the embodiments to be described herein, the creation of an electronic communication device having optimized sensor capability is provided. The issues of energy conservation, memory capacity and efficient transfer and clearing of data are addressed without the facilitation of human biological functions.

Figure 2:
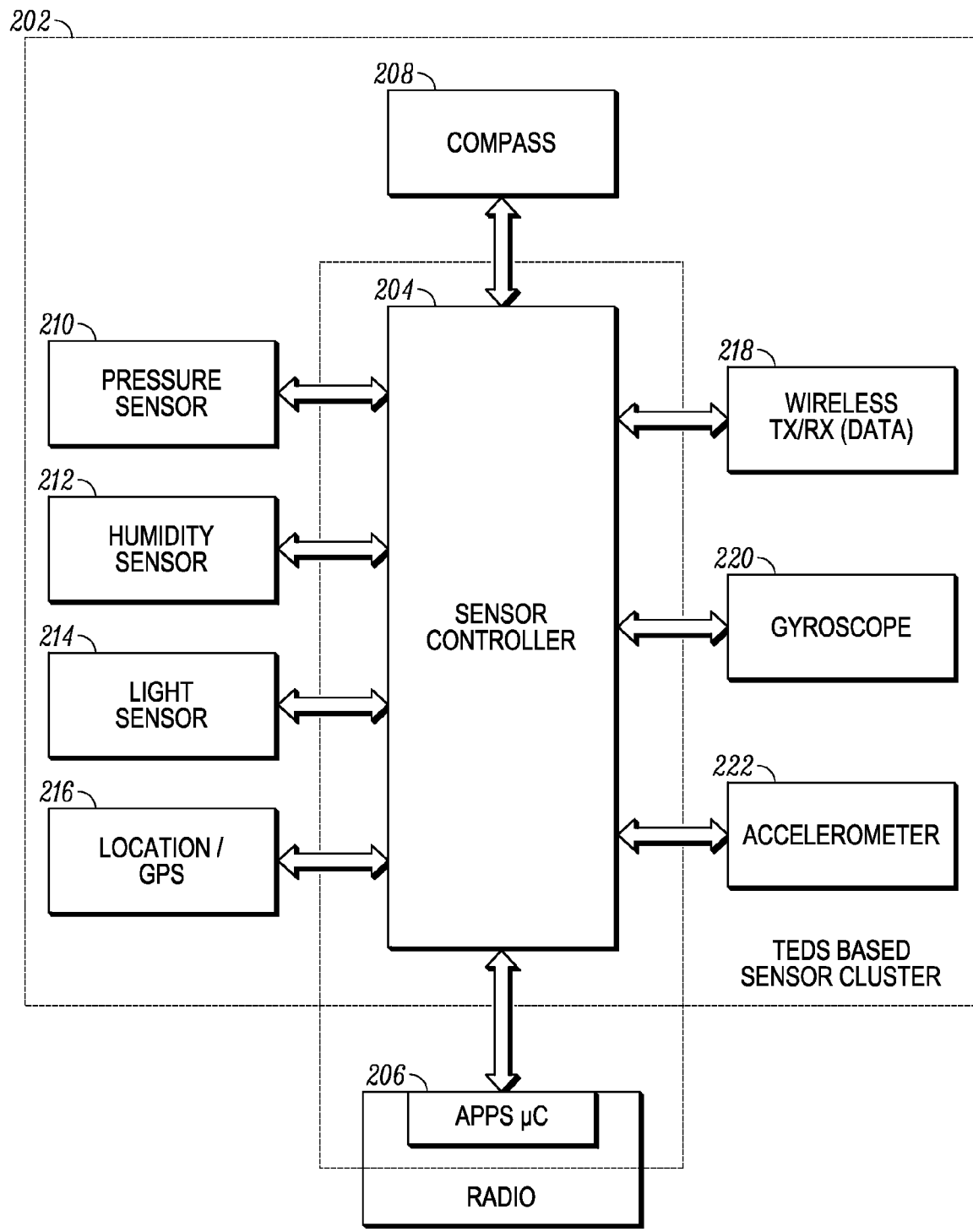
FIG. 2 is block diagram of a sensor enhanced electronic device in accordance with various embodiments of the invention.

In accordance with the various embodiments of the invention, a sleep mode is introduced as part of a standby mode for a sensor enhanced communication device, such as a two-way radio. While the sleep mode for the sensor enhanced device requires the use of additional energy, which is contrary to the goals of standby, in the overall use of the device, energy will be saved if the sleep mode is used in the manner to be described herein in accordance with the various embodiments of the invention. Referring to FIG. 2, there is shown a block diagram of a sensor enhanced device (SED) in the form of a portable two-way radio communication device 200 operating in accordance with the various embodiments of the invention. Communication device 200 includes transducer electronic data sheet (TEDS) based sensor cluster 202. The TEDS based cluster 202 includes a sensor controller 204 controlling a plurality of sensors and transducers 208-222. For the purposes of this application, the term SED will be used to describe the overall device with the understanding that the SED includes a TEDS based cluster of sensors and transducers.

The plurality of sensors and transducers 208-222 may be integrated within the portable communication device 200 or coupled externally to the device, for example as an accessory. The sensor controller 204 is controlled by the radio's applications microcontroller 206, also referred to as a radio host microcontroller. Sensor controller 204 may be an independent controller from microcontroller 206 or may be integrated as part of microcontroller 206. In this embodiment, the plurality of sensors and transducers includes compass 208, pressure sensor 210, humidity sensor 212, light sensor 214, location/GPS 216, wireless transmit and receive 218, gyroscope 220 and accelerometer 222. Different sensors and transducers may be added and others deleted as best suits the needs of the end user of the device.

Unlike the human sensory function 104 of FIG. 1, the sensors and transducers within TEDS 202 are not energized all the time. In accordance with the various embodiments, the sensors and transducers are periodically energized to capture context information at a rate sufficient to provide useful data to the user. This is accomplished by the sensor enhanced portable communication device 200 providing for a standby mode wherein the standby mode includes a sleep mode. During the sleep mode the sensor controller 204 places the cluster of sensors into a temporary state of arousal by increasing the gain of the sensors. During sleep mode the microcontroller 206 transfers data to and from memory (memory within controller 206). During sleep mode the sensor controller 204 or microcontroller 206 or both 204 and 206 updates sensor variables 316 to provide incremental learning.

Figure 3:
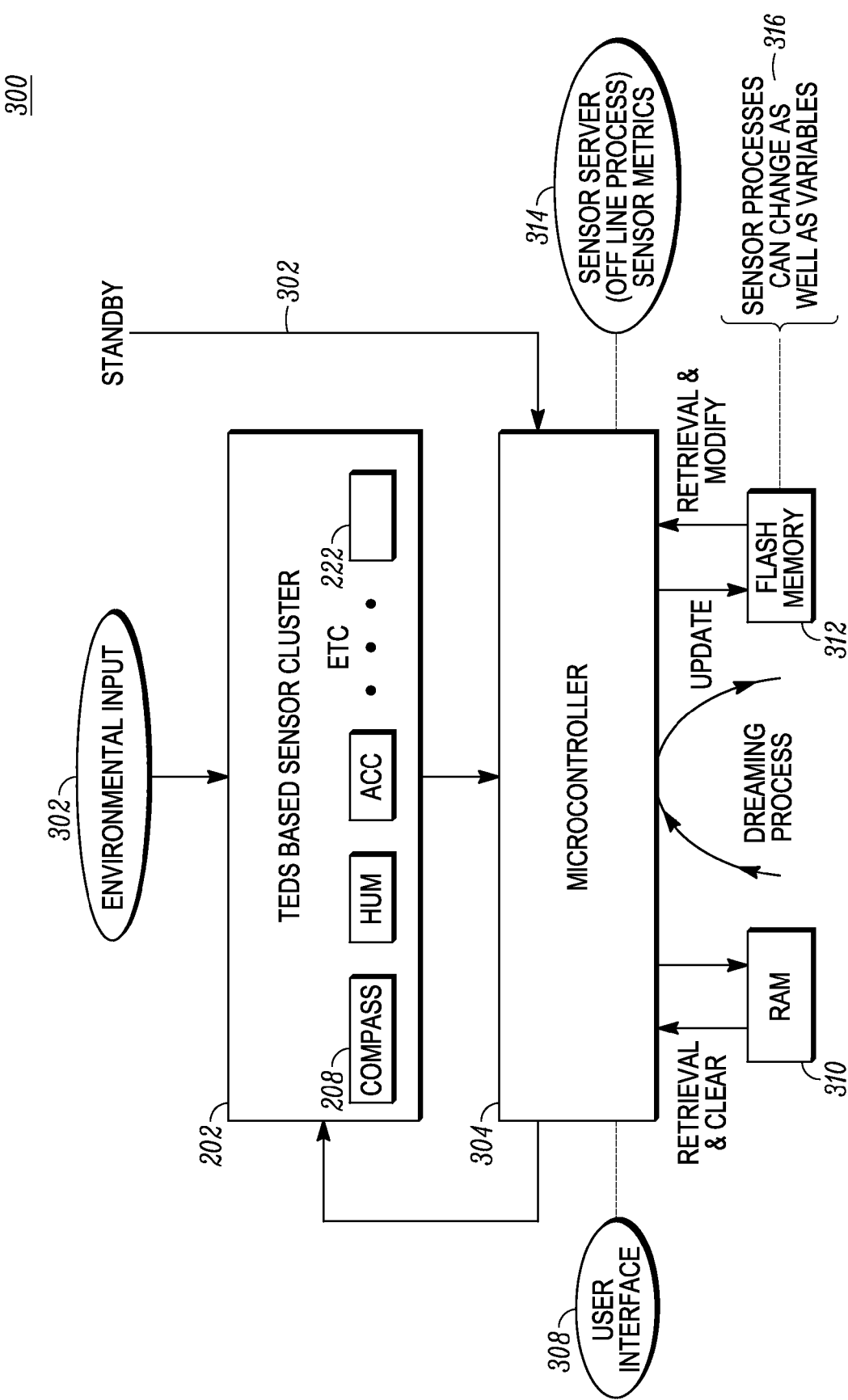
FIG. 3 is process management diagram for a sensor enhanced electronic device in accordance with various embodiments of the invention.

FIG. 3 is a process management diagram 300 for the SED of FIG. 2 in accordance with various embodiments of the invention. Process management diagram 300 illustrates the management of information between microcontroller 304 (which could be either sensor controller 204 or 206 or both 204 and 206 of FIG. 2) and TEDS based cluster 202 having sensors/transducers 208-222 and declarative memory in the form of random access memory (RAM) 310 and procedural memory in the form of Flash memory 312. While described in terms of RAM and Flash, other types of memory may be utilized, such as SRAM, SDRAM, PSRAM, ROM, DDR, nor-flash, nand-flash, to name a few. The TEDS based cluster 202 receives environmental inputs 302 which are processed via microcontroller 304. The SED communication device is provided with a wake mode and a standby mode having a sleep mode operating as a sub-mode of standby. Microcontroller 304 also processes standby input 302 for enabling the standby/sleep mode, a user interface 308 for providing mode control and over-riding gain management, and sensor metrics 314 from an external server. A discussion of each of operating mode follows.

Wake mode is analogous to normal radio operation and includes internal processing of sensor data and the process of transferring bi-directional information to the server as the radio enters and exits standby mode. During wake mode, full operation occurs of the SED device. RAM 310 is used during normal operation in algorithms used to do sensor fusion to perform a task. For example, a fusion algorithm could take incoming sensor data, such as humidity, lighting conditions, and temperature and provide information as to the radio's current environment, such as identifying a particular room within a building based on the incoming sensor data. During wake mode, information about the environment is received at 302 and sensor metrics 314 are received from a sensor server, including context and location information. The information received during wake mode is stored in RAM 310 or sent to an external server which provides off line processing. Wake mode provides immediate processing of environmental inputs 302 and sensor metrics 314 based on pre-existing rules and processes. The pre-existing rules and processes may be a function of for example, channel bandwidth, or information previously loaded into the radio based on customer orders, market research or other user based parameters for the product. The sensor server contains several elements for use by the SED. During wake mode the server acts as a sensor database that contains the TEDS of each sensor, the latest information sent from the radio (such as gain settings, operational status, etc.), and user interface constraints (what the user is allowed to control regarding SED operation). If the manufacturer of any of the SED sensors makes changes to the sensor specifications regarding operation, the TEDS information is provided to the SED radio for updates.

Processes including, retrieval, rehearsing and leaning are uploaded into the RAM 310 when the sensor enhanced device is built and powered up. Reasoning and decisions are hard coded into the microcontroller 304 such that the SED performs cognitive processing based on environmental input sensed by the sensors and transducers during wake mode.

Prior to the radio entering standby mode, it may need to send information to the server, since the server can only work while the radio is in normal/wake operation. In response to the microcontroller 304 receiving the standby input 302, the SED sends the sensor data to the server and then enters standby mode in which the microcontroller 304 drops to its minimal MIPS (million instructions per second) mode, operating minimal procedures associated with both communication and SED processes. In the process of minimizing radio communication functions, microcontroller 304 extracts SED process variables and metrics currently being used in sensor functions based on predetermined rules and cognitive processing and moves them into RAM 310. The microcontroller 304 then initiates executable code in the form of an Application Programming Interface (API) to enter into a sleep mode. Alternatively, when the amount of declarative and procedural memory (RAM/FLASH) 310, 312 exceeds a predetermined threshold, the radio enters a sleep mode.

The sleep mode performs a subset of operations and is implemented as a periodic occurrence within standby mode but operating at reduced clock rates. During sleep mode, no server functions occur, but in accordance with these embodiments, sensor sampling rates are dropped while sensor sensitivity is enhanced to create a state of sensor arousal. Sleep mode provides memory transfers between microcontroller 304 and RAM 310 and Flash 312. Sensor variable changes 316 from the controller to the sensor are performed to provide incremental learning during sleep mode. Once the standby command is initiated (usually by the radio if no communication activity is going on) the variables in the RAM are preserved and sent to the server just prior to sleep. Also, right before sleep, the sensor settings are transferred from the sensors and moved into RAM 310 and eventually moved into Flash 312. Based on the previously stored TEDS information associated with each sensor, a new set of predetermined sensor settings are uploaded from Flash 312 into the sensors within the sensor cluster 202. These settings put the sensors into the highest state of arousal. The radio then enters a sleep mode, where the settings that were established for the current environmental conditions are stored in RAM 310 and then moved into Flash 312. Upon entering wake mode, these same settings are put back into the sensors of the sensor cluster 202 without having to have the sensors waste energy re-acquiring environmental conditions.

The processing and transfer of memory from RAM 310 to Flash 312 during sleep mode will be referred to as "dreaming." During the dreaming process, some additional radio energy is expended to process pre-standby SED operational conditions into RAM storable variables and metrics prior to task termination, but the lack of urgency and the movement of information from RAM space that is randomly used by the fusion algorithm located in the microcontroller to Flash memory 312 allows the transfer to take place in a low power mode of the radio. While the user interface 308 is minimized during sleep mode, functions such as audio tones and other lower power operations are performed to indicate the process status of the SED. RAM clearing functions occur during sleep mode while the dreaming process of transferring data can continue to take place. During sleep mode, the microcontroller 304 is operating at a lower clock frequency and performing minimal tasks including transferring RAM 310 into long term Flash 312, programming the sensors to maximum sensitivity, and waiting for any indications to go into wake or standby modes. In the event of a wake or standby mode change, the cluster 202 need not re-acquire sensor metric information (gain, sample rate, communication rate, etc.) upon entering wake mode since it was stored prior to sleep. As such, the sleep mode provides overall power efficiency while using a SED device.

Unlike the sleep mode of the human brain, the sleep mode provided for the SED of the present invention drops the sensor sampling rate significantly while enhancing the sensitivity of the sensors to create a state of arousal. During sleep, the SED declarative (RAM) and procedural (Flash) memories 310, 312 are modified based on historical data and sensor responses that were received prior to standby. During sleep mode, sensor variable changes can be performed by the microcontroller 304 to the sensor to provide incremental learning to the sensors and transducers but at reduced functionality.

Operation of the SED goes from wake to standby to sleep, and the transition from wake to standby takes place if no sensor alerts occur. The SED goes from sleep to wake if the transceiver gets activated or if the sensors detect an alert. An alert is a preprogrammed condition defined by the manufacturer or the user that warrants the radio goes into wake mode in the fastest time possible. Leaving the sleep mode to go back into full standby mode can occur in response to a user request.

Figure 4:
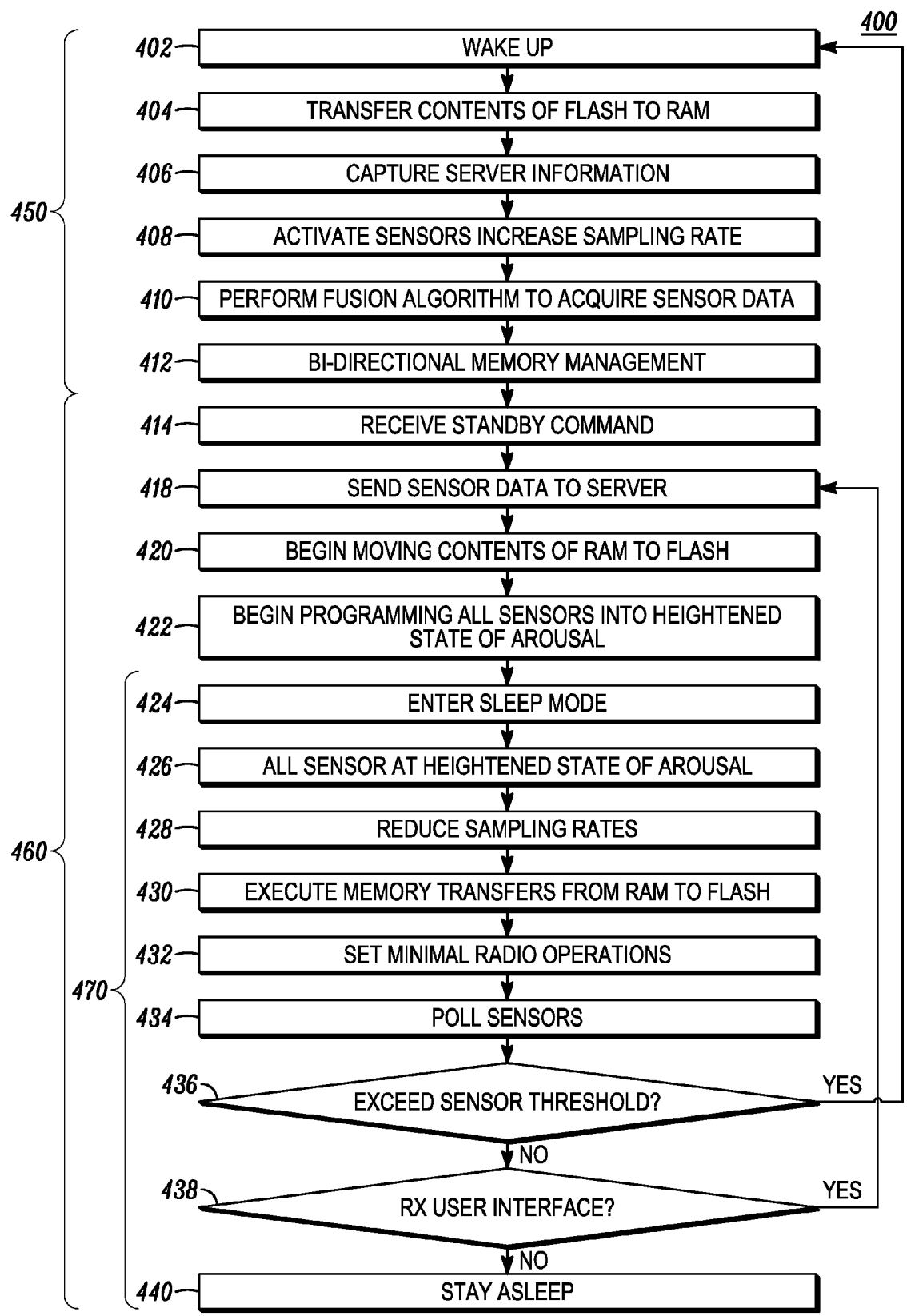
FIG. 4 is a flowchart of each of the operating modes for a sensor enhanced electronic device operating in accordance with the various embodiments of the invention.

Hence, the SED communication device is managed in accordance with the various embodiments between a wake mode, a standby mode and a sleep mode, wherein the sleep mode is a subset of the standby mode. Referring to FIG. 4, a flowchart 400 is shown that describes each of the modes in step-like format. During wake mode 450 the portable sensor enhanced two-way radio wakes up at 402 and the microcontroller moves the old RAM variables or the sensor states that were stored in Flash during sleep, back into RAM at 404. Sensors/transducers are activated and sensor sampling rates are increased at 408. A sensor fusion process is performed to acquire sensor data at 410 and bi-directional memory management and server exchanges occur at 412.

Upon receipt of a standby command at 414 the radio enters standby mode 460. During standby mode sensor data is sent to the external server at 418, and the contents of RAM begin moving to Flash at 420. Programming begins at 422 to program the sensors into a state of heightened arousal.

The SED enters sleep mode 470 beginning at 424 in response to the microcontroller initiating an API code or alternatively, in response to the amount of declarative and procedural memory (RAM/FLASH) exceeding a predetermined threshold. All sensors are at a heightened state of arousal 426 and sampling rates are reduced at 428. Memory transfers from RAM to Flash are executed at 430 while minimal radio operations are set at 432. Sensors are polled at 434, and if a sensor threshold is exceeded at 436, the SED returns to wake mode 450. If the sensor threshold is not exceeded at 436, a check is made to see if a user interface input has been received at 438 to place the SED into standby mode returning to 414 or wake mode returning to 402. If no sensor threshold has been exceeded at 436 and no standby or wake input has been received at 438, the SED remains in sleep mode at 440.

Accordingly, there has been provided a sensor enhanced communication device that provides an optimized standby mode of operation which puts a cluster of sensors and transducers into sleep mode. Overall power efficiency is provided during the standby/sleep mode by sensor and transducer access being reduced and sensor and transducer sampling rates being significantly decreased. Placing the sensors into a state of "arousal" as part of standby operation is advantageous in that the cluster of sensors and transducers need not re-acquire sensor metric information upon entering wake mode. Memory capacity along with efficient transfer and clearing of data are provided by sensor memory transfers between controller and memory and incremental learning provided by sensor variable changes from the controller to the sensor. As such, the sleep mode provides overall power efficiency and management of resources to the sensor enhanced communication device. The benefits of the SED formed and operating in accordance with the embodiments are particular advantageous in a two-way radio environment where power management is critical to battery life.

Those skilled in the art will appreciate that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method of managing a battery powered portable communication device having a cluster of sensors and transducers, comprising:
   providing a wake mode, a standby mode and a sleep mode;
   in wake mode:
   receiving sensor process variables from a server;
   providing full operation of the communication device in which sensor and transducer sensitivity is set for current environmental conditions without re-acquiring sensor metric information;
   transferring contents from procedural memory to declarative memory;
   in standby mode:
   sending acquired sensor data to external server;
   moving contents from declarative memory to procedural memory; and
   enabling sleep mode;
   in sleep mode;
   increasing sensor and transducer sensitivity to acquire sensor data;
   reducing sensor and transducer sampling rates, the increased sensitivity and reduced sampling rates enabling a state of arousal of the cluster of sensors and providing low power processing;
   transferring bi-directional data between declarative and procedural memory; and
   updating sensor process variables with sensor metric information based on the acquired sensor data.

2. The method of claim 1 wherein the step of enabling sleep mode as part of standby mode comprises one of:
   receiving an Application Programming Interface (API) code; and
   determining that declarative and procedural memory has exceeded a predetermined threshold.

3. The method of claim 2, wherein in the sleep mode the step of updating sensor process variables with sensor metric information based on the acquired sensor data provides incremental learning to the sensors during sleep mode.

4. A sensor enhanced portable two-way radio, comprising:
   a cluster of sensors and transducers; and
   a microcontroller providing a wake mode and a standby mode, the standby mode providing a periodic sleep mode to the cluster, the microcontroller placing the cluster into a temporary state of arousal during the sleep mode, wherein the microcontroller induces the sleep mode by increasing sensor and transducer gains and reducing sensor and transducer sampling rates.

5. The sensor enhanced portable two-way radio of claim 4, wherein the microcontroller transfers data to and from memory and provides updated sensor process variables to the sensors and transducers for incremental learning during sleep mode.

6. The sensor enhanced portable two-way radio of claim 5, wherein during the standby mode the microcontroller reduces the gain of the sensors and transducers and increases the sampling rate of the sensors and transducers.

7. The sensor enhanced portable two-way radio of claim 6, wherein the sensors and transducers acquire sensor metric information during sleep mode and without re-acquiring the sensor metric information during wake mode.

8. A sensor enhanced communication device, comprising:
   a radio host microcontroller;
   memory coupled to the radio host microcontroller;
   a cluster of sensors;
   a sensor controller responsive to the radio host processor for controlling the cluster of sensors, the sensor controller putting the cluster of sensors into a sleep mode from a standby mode upon standby command from the radio host processor wherein the cluster of sensors, in the sleep mode, enter a state of arousal in which sensor sensitivity is enhanced and sampling rate is reduced, the sensor controller providing low power processing and transfer of memory between RAM and FLASH memory residing in the sensor controller during sleep mode; and
   the cluster of sensors remaining in sleep mode until the sensor controller indicates a wake mode of operation wherein processing and transfer of data between the cluster of sensors and memory occurs, wherein the sensor controller performs sensor process variable changes in the form of incremental learning to the cluster of sensors during sleep mode.

9. The sensor enhanced communication device of claim 8, wherein the sensitivity is enhanced by maximizing sensor gain.

10. The sensor enhanced communication device of claim 8, wherein the sampling rate is reduced by restricting data transfer from memory to and from the sensors during sleep mode.

11. The sensor enhanced communication device of claim 8, wherein the restriction of data transfer comprises limiting data transfer to procedural memory changes from controller RAM to FLASH memory during sleep mode.

12. The sensor enhanced communication device of claim 8, wherein the memory comprises RAM and Flash memory.

13. The sensor enhanced communication device of claim 8, wherein the communication device comprises a portable two-way radio.

14. A sensor enhanced communication device, comprising:
   a radio controller;
   memory coupled within the radio controller;
   a cluster of sensors coupled to the radio controller; and
   the radio controller controlling the cluster of sensors by putting the cluster of sensors into a sleep mode from a standby mode in response to a standby command, wherein the sleep mode places the cluster of sensors into a state of arousal in which sensor sensitivity is enhanced and sampling rate is reduced, the radio controller providing low power processing and transfer of sensor data to and from memory, the cluster of sensors remaining in sleep mode until the radio controller indicates a wake mode of operation wherein processing and transfer of data between the cluster of sensors and memory occurs.

15. A method of operating a sensor enhanced radio, comprising:
enabling a standby mode of operation in response to a lack of environmental input to a cluster of sensors;
placing the cluster of sensors into a sleep mode from the standby mode in response to the standby command, the sleep mode inducing the cluster of sensors into a state of arousal in which sensor sensitivity is enhanced and sensor sampling rate is reduced;
enabling a wake mode of operation in response to at least one sensor receiving an environmental input; and
processing and transferring data between the cluster of sensors and memory in response to receiving the wake mode.

16. The method of claim 15, wherein the step of receiving a standby command further comprises comparing the contents of procedural and declarative memory to a predetermined threshold and generating the standby command when the memory exceeds the predetermined threshold.

17. The method of claim 16, wherein the step of placing the cluster of sensors into a sleep mode further comprises processing and transferring data between RAM and Flash memories in a low power mode.

18. The method of claim 17, wherein the sleep mode further comprises:
placing sensors into a state of arousal by maximizing sensor gain;
performing sensor memory transfers between controller and memory; and
performing sensor process variable changes thereby providing incremental learning to the sensors.

19. The method of claim 1 wherein in wake mode:
the sensor process variables received from the server are not sensing output of the sensors.

20. The method of claim 19, wherein in wake mode: the server operates as a sensor database containing a transducer electronic data sheet (TEDS) for each sensor, radio information, and user interface constraints.

21. The sensor enhanced portable two-way radio of claim 5, wherein the updated sensor process variables provided to the sensors and transducers comprise information pertaining to a transducer electronic data sheet (TEDS) for each sensor, radio information, and user interface constraints.

22. The sensor enhanced communication device of claim 8, wherein the sensor process variable changes to the cluster of sensors are based on transducer electronic data sheet (TEDS) for each sensor, radio information, and user interface constraints.

23. The method of claim 18, wherein the sensor process variable changes are based on transducer electronic data sheet (TEDS) for each sensor, radio information, and user interface constraints.

24. The sensor enhanced communication device of claim 14, wherein the radio controller performs sensor process variable changes in the form of incremental learning to the cluster of sensors during sleep mode.

25. The sensor enhanced communication device of claim 24, wherein the sensor process variable changes to the cluster of sensors are based on transducer electronic data sheet (TEDS) for each sensor, radio information, and user interface constraints.

* * * * *